United States Patent

Hogg

[15] 3,701,029
[45] Oct. 24, 1972

[54] AXIAL TRAJECTORY SENSOR HAVING GATING MEANS CONTROLLED BY PULSE DURATION MEASURING FOR ELECTRONIC PARTICLE STUDY APPARATUS AND METHOD

[72] Inventor: Walter R. Hogg, Miami Lakes, Fla.
[73] Assignee: Coulter Electronics, Inc., Hialeah, Fla.
[22] Filed: Oct. 27, 1970
[21] Appl. No.: 84,440

[52] U.S. Cl..................328/91, 324/71 CP, 328/112, 328/117, 328/148
[51] Int. Cl..........................H03k 17/02, H03k 5/20
[58] Field of Search.............................307/234, 267; 328/111–112, 115–117, 146–149, 58; 324/71 R, 71 CP; 235/92 PC, 151.30, 151.31

[56] References Cited

UNITED STATES PATENTS

| | | | |
|---|---|---|---|
| 2,996,624 | 8/1961 | Mumma | 328/116 UX |
| 3,502,973 | 3/1970 | Coulter et al. | 235/92 PC X |
| 3,548,206 | 12/1970 | Ogle et al. | 328/116 X |
| 3,553,593 | 1/1971 | Gedance | 328/112 |
| 3,557,352 | 1/1971 | Hogg et al. | 235/151.3 |
| 3,600,688 | 8/1971 | Booth | 328/111 |

Primary Examiner—Stanley D. Miller, Jr.
Attorney—Silverman & Cass

[57] ABSTRACT

A sensor for use with apparatus operating in accordance with the principles of the Coulter electronic particle studying device, for differentiating between pulses produced by particles passing on axial or nearly axial paths through an aperture and pulses produced by particles passing off center. The pulse duration is measured at some fraction of the individual pulse amplitudes and only those which meet the criteria of duration established by the electronic circuitry are permitted to pass for use in pulse height analysis apparatus following the sensor. The other pulses are discarded on the basis of their greater durations. The apparatus of the invention provides structure for deriving a duration-measuring pulse whose duration is that of the particle pulse at its fractional amplitude, converting the signal into one which has an amplitude proportional to duration, and then subjecting the latter signal to the criteria of duration established as amplitude levels to operate gating means automatically for rejecting the longer duration pulses and passing the shorter duration pulses.

33 Claims, 6 Drawing Figures

INVENTOR
WALTER R. HOGG

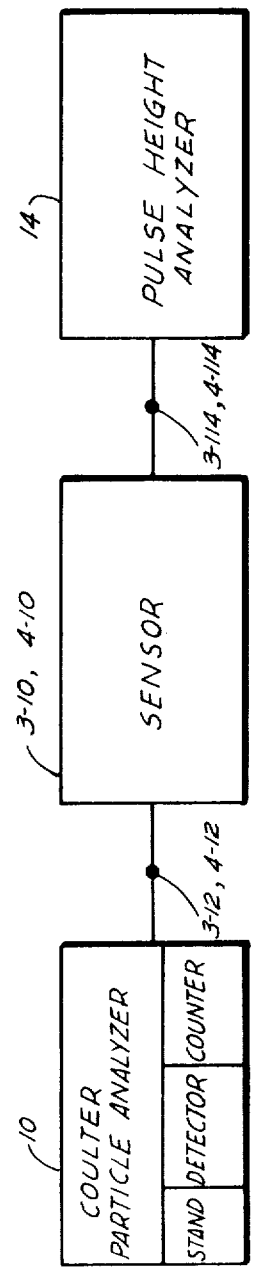

AXIAL TRAJECTORY SENSOR HAVING GATING MEANS CONTROLLED BY PULSE DURATION MEASURING

BACKGROUND OF THE INVENTION

The field of this invention is particle analyzing apparatus and more particularly is concerned with apparatus in which studies may be made of particulate systems using the Coulter sensing principle in a manner to obtain more accurate size information than heretofore achieved.

The Coulter sensing principle is disclosed in U.S. Pat. No. 2,656,508 issued Oct. 20, 1953 to Wallace H. Coulter. According to this principle, when a microscopic particle in suspension in an electrolyte is passed through an electrical field of small dimensions approaching those of the particle, there will be a momentary change in the electric impedance of the electrolyte in the ambit of the field. This change of impedance diverts some of the excitation energy into the associated circuitry, giving rise to an electrical signal. Such signal has been accepted as a reasonably accurate indication of the particle volume for most biological and industrial purposes. Apparatus embodying the teachings of U.S. Pat. No. 2,656,508 has been used to count and size particles in biological fluids, industrial powders and slurries, etc.

The principles of the present invention apply to Coulter particle analyzing apparatus in which the excitation of the field is achieved by means of unidirectional or low frequency power sources or radio frequency power sources.

In commercial versions of the Coulter particle analyzing apparatus, the electric field of small dimensions has been formed commonly by a microscopic right cylindrical passageway or aperture, as it is known, between two bodies of liquid in which the particles to be studied are suspended. The electrical excitation energy is coupled to these bodies by means of electrodes respectively located in the liquid bodies, the aperture being formed in an insulating wall between the bodies. The suspension is caused to flow through the aperture carrying the particles with the flow and giving rise to the electric signals produced by the momentary changes in impedance caused by the respective particles as they pass through the aperture. The electric field is concentrated in the aperture and normally comprises an electric current flowing through the aperture along with the physical flow of suspension.

By counting the signals produced, one can count the particles passing through the aperture. By discriminating between different pulse amplitudes, one can make size studies. This invention is primarily concerned with size studies, and has, as a very important object thereof, the provision of apparatus which will enable highly accurate particle size data to be achieved.

It has been known that "long" apertures can produce results which are superior to short apertures insofar as size measurements are concerned, if the bandwidths of the associated amplifiers are reduced accordingly. A long aperture may be considered one in which the length is greater than the diameter. The usual Coulter aperture is relatively short, that is, its length is the same as or less than its diameter.

The reason for better size information with long apertures is that the electrical field halfway through the aperture, being the position most remote from the entrance and exit of the aperture, is most uniform and has the most uniform current distribution for all paths through the aperture. The longer the aperture, the more nearly uniform is the field at this midpoint. At the entrance and exit of the aperture, the current density is greater at the edges of the aperture and correspondingly lesser on the axis of the aperture. This may be explained by pointing out the current paths other than the axial path are supplied from the sides of the aperture as well as straight ahead. The lower current density on the axis at the entrance and exit results in a lower instantaneous signal than is the case for particles entering the aperture and leaving it on other paths. In other words, the current density at the corners of the aperture is greater than at the axis.

Another phenomenon is important to consider, according to this invention. The velocity of electrolyte flow, and hence the velocity of particles also, is somewhat greater on an axial path than on paths closer to the edges of the aperture or paths which are off-center, because the liquid does not have to change direction when it goes through the axial center of the aperture. The resistance to flow is a minimum on the axis since it is surrounded by a moving sheath of liquid having substantially the same velocity.

The prior art has recognized the problem involved in the use of the Coulter apparatus for sizing studies, but so far as is known, there has been no satisfactory solution. One attempt involved releasing the particles in a suspension from a focussed source ahead of the aperture; but this involved the use of two apertures and the inability to illuminate and view the aperture during the process.

The use of long apertures poses too many problems to make the same practical. The long aperture has less sensitivity. It adds resistance to the effective aperture which generates noise tending to mask the signals. Microphonic modulation of the aperture is also increased. The long aperture is more likely to have coincident particles in it, giving rise to counting and sizing errors. The long aperture is more likely to become blocked by debris and is not as easy to clear as a short aperture. The flow rate of long apertures is decreased because of increased resistance to flow, thus decreasing the time for making any given studies.

SUMMARY OF THE INVENTION

According to the invention, particles passing through an aperture are examined electronically to ascertain which of them passed most nearly on axial paths through the aperture. These are the only particles which are permitted to be regarded by the apparatus, the others being disregarded. The electronic selection is based on the fact that the particles following axial paths spend the least time in the ambit of the aperture, and therefore their corresponding pulses have the shortest duration. Theoretically, all pulses passing through the aperture, regardless of size, will have the same duration; but because of the reasons given above, this is not practically true. Pulses which pass through the aperture off-center will normally have longer durations.

By disregarding a percentage of the pulses, fewer are considered by the pulse height analyzing equipment which follows the sensor of the invention, resulting in a slight degradation in the statistical accuracy if a given amount of sample of a given concentration is scanned. The data which are achieved, however, are of much higher quality. If a count is required, this is made before the signals are processed in the sensor of the invention.

The particle pulses are examined by ascertaining their durations at some fraction of their amplitudes. The resulting measuring signal is then converted into a pulse whose amplitude is proportional to the duration of the measuring signal. This amplitude is then compared with certain criteria to ascertain whether the original pulse was of a size to be passed to the pulse height analyzing equipment or to be disregarded.

BRIEF DESCRIPTION OF THE DRAWINGS

FIG. 5 is a block diagram of a system constructed in accordance with the invention and using an axial trajectory sensor.

DESCRIPTION OF THE PREFERRED EMBODIMENTS

This invention is based upon a practical consideration of the electric pulses which result when a suspension of particles is passed through the aperture of a Coulter electronic particle analyzing device. Since the physical length of the aperture is constant, and one would consider that the rate of flow remains constant, it should follow that all particle pulses, that is, the electrical signals produced in the detector of the Coulter apparatus, should have the same duration. That this is not true has been known for some time. A particle passing through the aperture on an angle, such as for example, entering close to an edge of the entrance and/or passing close to a wall of the aperture, will not have the same duration as the identical particle entering on the axial center and passing through the center of the aperture. Additionally, the amplitude and/or profile of the signal may be considerably different from the signal produced by the on-center particle.

In this invention, the basic concept is to measure the pulse duration of the signals produced by the particles passing through the aperture and then to discriminate between these signals in some way, discarding the larger of them and using only the smaller ones. The circuitry of the sensor of the invention embody the method for doing this and utilize certain novel structure for applying criteria for discarding some and using others. Prior to detailing such circuitry, it would be of value to explain the differences between the types of pulses which are produced by particles passing through the aperture of a Coulter electronic particle analyzing device.

A system constructed in accordance with the invention is illustrated in FIG. 5. The block 10 comprises a Coulter particle analyzing apparatus which is normally composed of a stand, detector and counter. The stand includes the vessels, aperture tube, fluid system and electrodes of the apparatus. The detector includes circuitry which produces the particle pulses. The counter may be any device which responds to the particle pulses, and may include pulse height discriminating means. It may be omitted in instances where only size studies are to be made, but is shown in order to point out that since the sensor 3-10 will be discarding many pulses, it is best to make any counts prior to applying the particle pulses to the sensor 3-10. As seen, from the sensor 3-10, the output signals at 3-14 are applied to some form of pulse height analyzer 14 in order to make the sizing studies.

Figure 1:
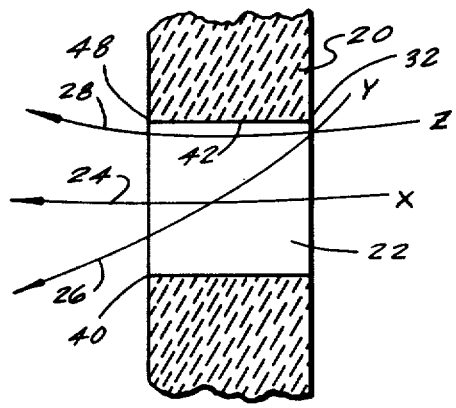
FIG. 1 is a diagrammatic view of the aperture of a Coulter particle analyzing apparatus showing the paths of different particles through the apparatus.

FIG. 1 is a diagrammatic view of an aperture which constitutes the scanning means in the stand of Coulter electronic particle device 10, immersed in a liquid and having particles passing through the aperture of the wafer. Thus, the wafer is designated 20, and the aperture itself is designated 22. The sample liquid is passing through the aperture 22 from right to left, and as it moves, it carries the particles in suspension with it. The paths of three particles, X, Y, and Z, are illustrated at 24, 26, and 28, respectively. These paths are deliberately chosen to be considerably different, for purposes of illustration, and the signal or particle pulses which are produced as a result of such passage are shown on the identical time base in FIG. 2 at graphs X, Y, and Z.

The particle X passes almost coaxially of the aperture 22 along the path 24. The speed of the liquid passing through the aperture at this point is maximum and the current density distribution along the path is most uniform. Accordingly, the resulting pulse 30 in FIG. 2, as shown in the curve X, is a simple bell-shaped pulse whose duration is proportional to the length of the aperture 22 from $t_1$ to $t_2$ and whose amplitude is quite closely proportional to the size of the particle. Although the amplitude will be considered as voltage, it should be understood that pulses and signals could also be current waves.

The particle Y passes through the aperture 22 on a diagonal path 26. In the first place, it will be appreciated that its path, while traversing the aperture, is longer than the path 24 because it is at an angle. In the second place, at the point where it entered the aperture, this being a corner at 32, the current density is much higher than that closer to the axis of the aperture. Accordingly, the beginning of the pulse 34 which is produced by this particle, will have a higher amplitude, and will also probably commence slightly before the pulse 30. If it commences at practically the same time $t_1$, due to its time within the aperture being longer, it will finish later than the time $t_2$. As shown, there is a peak at 36 due to the effect of high current density at the corner 32, and a lesser peak at 38 which is produced when the particle leaves the aperture, since it is approaching the high current density at the corner 40.

The particle Z goes through the aperture 22 on a relatively straight line, but in this case it is quite close to the wall 42 of the aperture. The resulting pulse 42' has two peaks, one at 44 caused by the corner 32 with its high current density, and the other at 46 caused by the particle passing the high current density corner 48. In this case, the particle will remain in the aperture longer than the time $t_1$ to $t_2$ because the speed of flowing liquid is less adjacent the wall than it is in the center of the stream. This is a well-known phenomenon of flow of liquids through orifices.

In these three cases, it can be seen that the only pulse which is most truly representative of the size of the particle is that which passes through the center of the aperture 22, namely, the particle X. According to the invention, circuitry is provided to discard pulses of the other types, based upon their time duration, since it becomes clear that only the pulses of shorter duration have gone through the center of the aperture and produced the most representative wave shapes.

Figure 2:
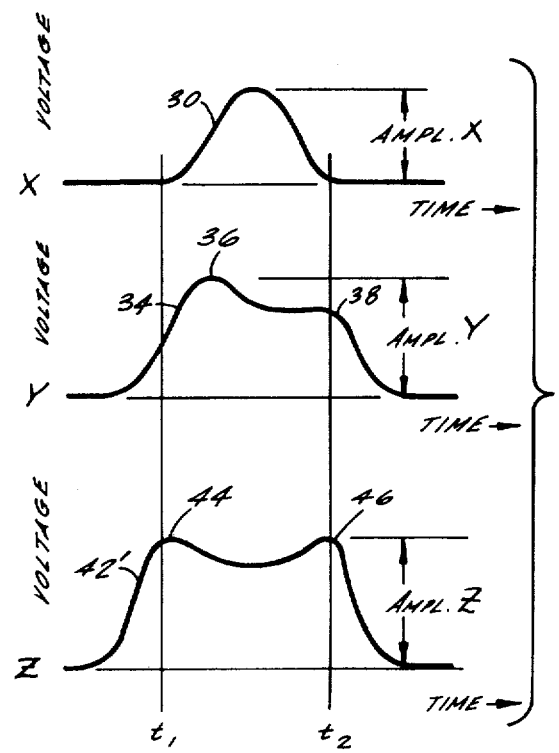
FIG. 2 is a diagram showing the graphs of particle pulses resulting from the passage of the particles of FIG. 1 along the paths shown through the aperture.
Figure 3A:
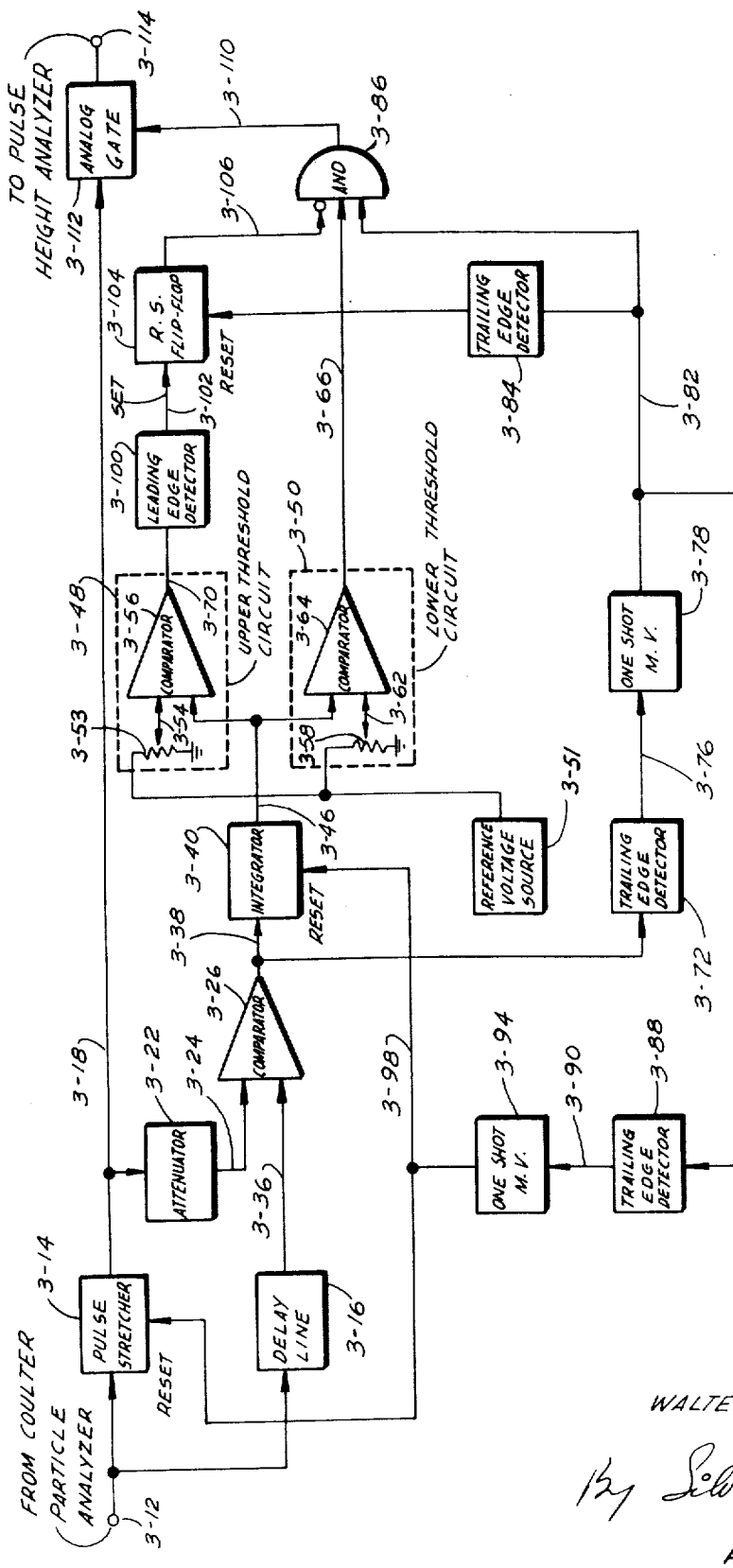
FIG. 3A is a block diagram of an axial trajectory sensor constructed in accordance with the invention, the apparatus herein being of the analog type.
Figure 3B:
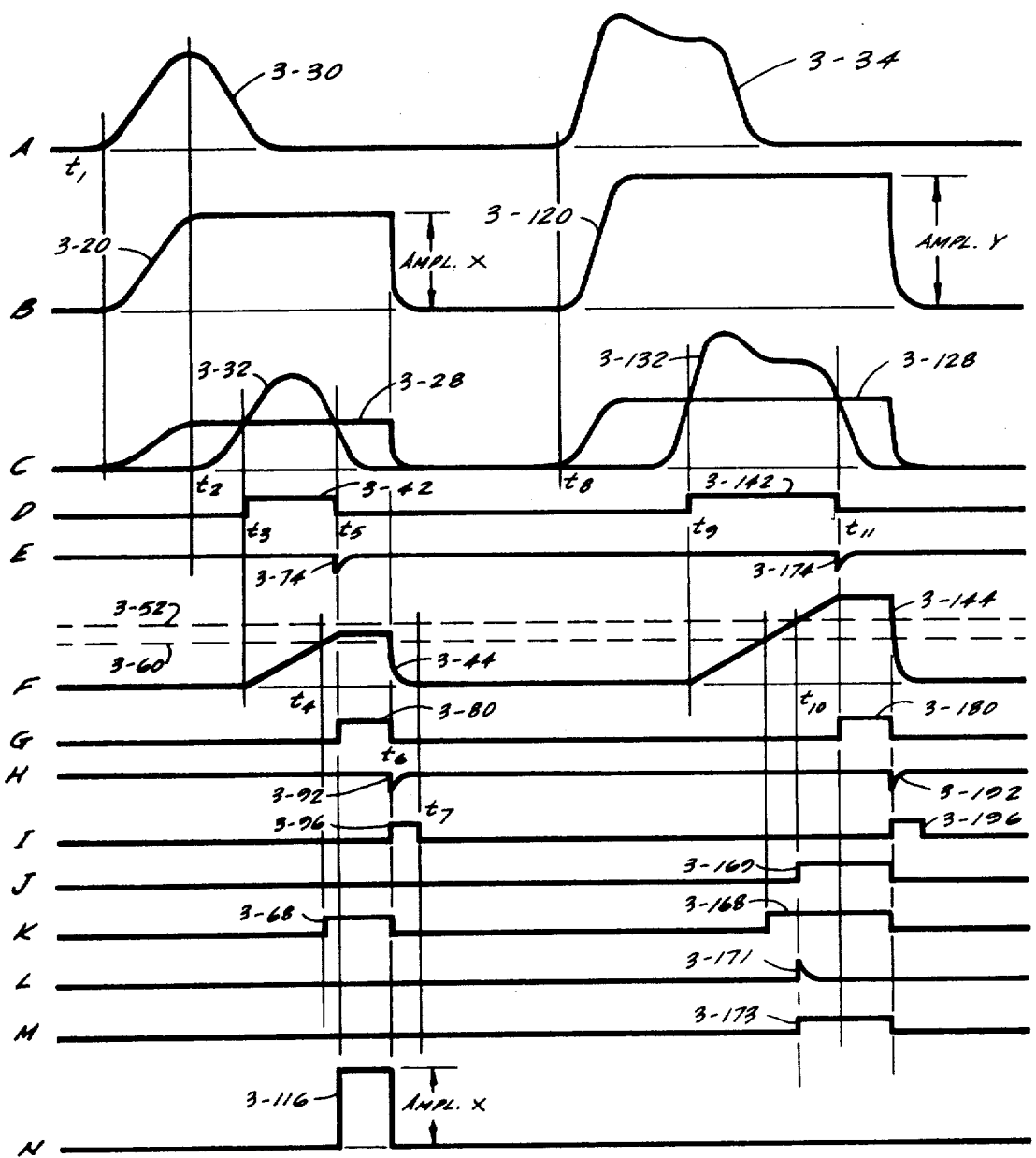
FIG. 3B is a diagram consisting of a series of graphs all on the same time scale illustrating various wave shapes throughout the sensor of FIG. 3A resulting from the processing of two particle pulses therein.
Figure 4:
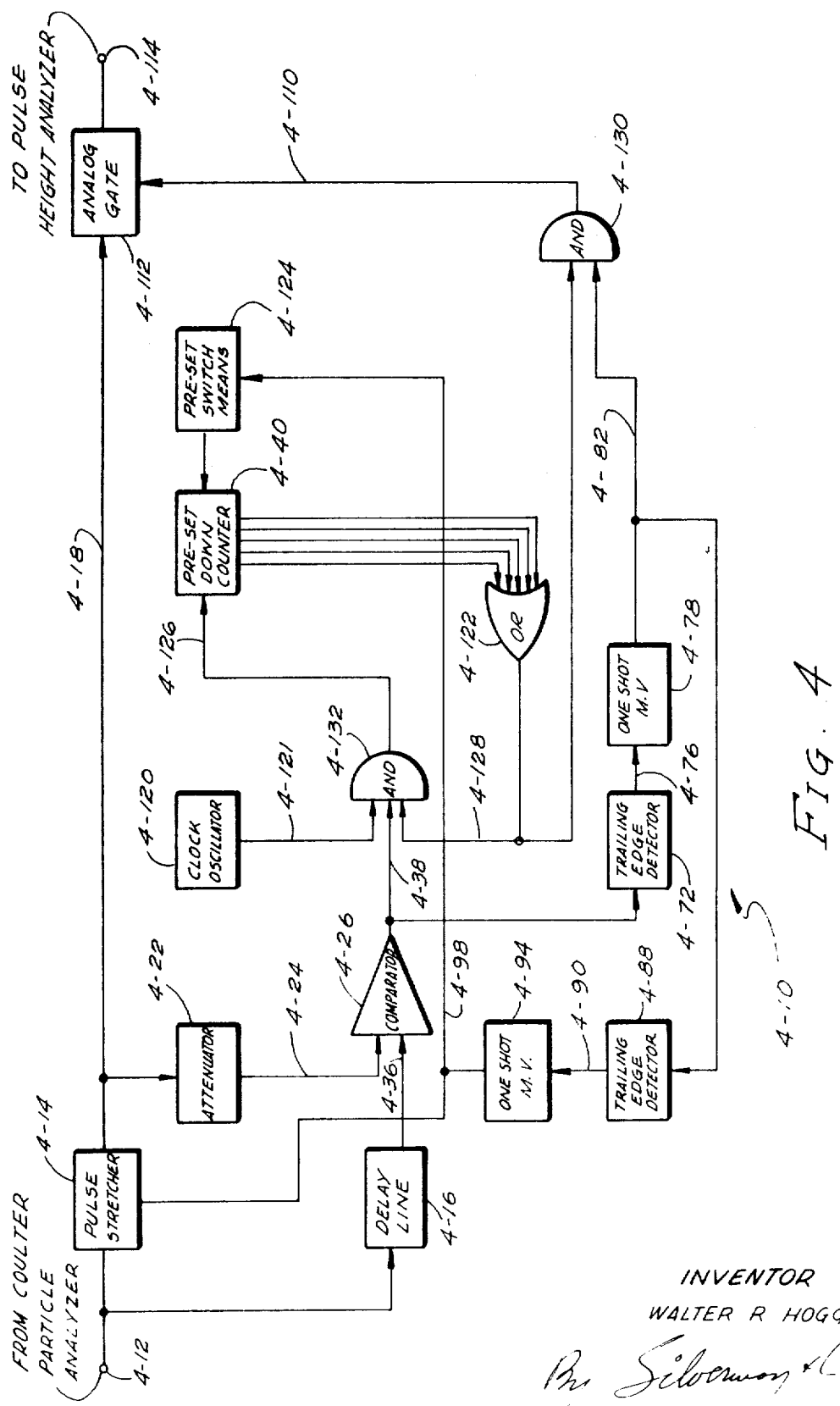
FIG. 4 is a block diagram of an axial trajectory sensor of a modified form, the apparatus herein being of the digital type.

According to the invention, structure is provided to discriminate between the different types of pulses which are illustrated in the graphs of FIG. 2. The basis for discrimination in the apparatus which is described in connection with FIGS. 3A and 3B is analog in nature, while the basis in the apparatus of FIG. 4 is digital. The analog basis is somewhat more flexible.

The block diagram of FIG. 3A illustrates an axial trajectory sensor constructed in accordance with the invention, utilizing the basic circuitry for achieving the ends of the invention. For the purposes of the explanation, it is assumed that two particles are being examined, such as particles X and Y of FIGS. 1 and 2, and the resulting wave shapes of the pulses throughout the circuit are illustrated in FIG. 3B, all on the same time base.

The apparatus of FIG. 3A is designated generally 3–10 and is characterized by the provision of means to discriminate between pulses of different durations, on the basis of which the desired pulses are chosen and permitted to pass through the apparatus, albeit in analog form. Thus, the output pulse, in the event one appears, in every case will have the identical amplitude as the original pulse, such as for example the pulse 30 of FIG. 2, but will have a predetermined duration governed by the electronic characteristics of the circuitry. Since size information is paramount, the duration of the output pulse is immaterial, and according to the operation of the apparatus, all output pulses will have the same duration.

The input terminal 3–12 has applied to it the train of pulses which emanate from apparatus that is constructed in accordance with the principles of said U.S. Pat. No. 2,656,508. As such, these pulses have been produced as a result of particles passing through an aperture such as 22 illustrated in FIG. 1 and are of different amplitudes, durations and configurations. Theoretically, the pulses emerging from a Coulter electronic particle device should all be bell-shaped, should all have the same duration and should differ from one another only as to their amplitude. Practically, this not always occurs. The invention is based upon the practical limitations of the usual Coulter device and seeks to render the information on size obtainable therefrom more accurate and reliable.

The train of pulses which is received at the terminal 3–12 has been amplified prior to application to the apparatus 3–10, this being accomplished by circuitry normally included in the detector of usual Coulter electronic particle counting and sizing apparatus 10 or even afterwards.

The signals appearing at the input terminal 3–12 are the particle pulses and are applied directly to the pulse stretcher 3–14 and the analog signal delay means 3–16. In the block diagram of FIG. 3A, this latter device is shown as a delay line, but other means could be used. The purpose of delaying the signal, as will be seen shortly from the wave shapes of FIG. 3B, is to give the pulse stretcher sufficient time to establish a level against which the actual pulse may be compared in order to give a good measure of its duration. The duration is measured at some fraction of the pulse height to give the most accurate results. In the example illustrated and described, this is chosen as one-half, but in other cases it could vary from that fraction. Success has been had with levels which are three-fourths of the pulse amplitude.

In the graph A of FIG. 3B, two particle pulses are illustrated, these appearing consecutively at the input terminal 3–12. One pulse is designated 3–30 commencing at the time $t_1$ and being substantially of the same type as the pulse 30 of FIG. 2. It is bell-shaped and has an amplitude X, as shown in graph B. It is chosen as an ideal pulse, one which has been produced by a particle passing through the aperture practically in the center of the aperture. The second pulse is designated 3–34 commencing at a time $t_8$ and being substantially of the same type as the pulse 34 of FIG. 2. It is not bell-shaped and has an amplitude Y, as shown in graph B. In accordance with the theory described herein, it is desired to accept the pulse 3–30 and discard the pulse 3–34 since the latter has a duration which is substantially greater than that of the former so that it is almost certain that its amplitude is not closely proportional to the size of the corresponding particle.

Considering now only the pulse 3–30, the pulse stretcher 3–14 causes the pulse to retain its maximum amplitude for a period of time after the input pulse subsides, so that the output of the pulse stretcher 3–14 appearing on the line 3–18 will consist of the elongated pulse 3–20 of graph B of FIG 3B.

A pulse stretcher is a circuit whose output follows its input so long as the input is increasing and retains the maximum amplitude reached, not changing thereafter regardless of the decrease of the input signal. This is accomplished by charging a condenser on the increase and preventing the discharge of the condenser during periods of input signal decrease. The result is a rectangular pulse whose leading edge is substantially the same as the leading edge of the input pulse, but the remainder of which has a constant amplitude. The rectangular pulse is completed when the condenser is discharged by some means external of the pulse stretcher circuit. The rectangular pulse comprising the output of the pulse stretcher 3–14 is the elongate pulse 3–20 of graph B of FIG. 3B. This elongate pulse 3–20 is attenuated in the attenuator 3–22 and appears on the input line 3–24 of the comparator 3–26. The resulting decrease in amplitude is the fraction chosen for use in the circuit 3–10, and the pulse is 3–28 in graph C. As previously mentioned, the attenuation is chosen as one-half so that the amplitude of the plateau of pulse 3–28 is one-half the amplitude X. Also appearing in the graph C is the delayed pulse 3–32 which is identical to the pulse 3–30 but occurs later in time, appearing at the line 3–36 as another input to the comparator 3–26. The duration of the pulse 3–30 typically would be 15 microseconds, and the delay time, that is from $t_1$ to $t_2$ is chosen to be some convenient value, say 20 microseconds. This depends upon the physical characteristics of the aperture, including its size, the viscosity of the electrolyte from which the suspension of particles is made, and the pressure drop across the aperture.

The delayed pulse 3–32 exceeds the plateau of the attenuated pulse at the times $t_3$ and $t_5$, and accordingly, the comparator 3–26 will produce an output only when this occurs. The output signal appears at the line 3–38 and becomes the input to the integrator 3–40. The output from the comparator is a rectangular wave 3–42 shown in the graph D of FIG. 3B which has any chosen amplitude, this latter being the same for all pulses, and a duration of $t_3$ to $t_5$. The wave 3–42 is a measure of the duration of the particle pulse taken at a fraction of the amplitude of the particle pulse, which is one-half in this case. This is the duration-measuring pulse referred to hereinafter, since the pulse enables the derivation of an electrical quantity whose value is proportional to its time duration.

In the sensor 3–10, the duration-measuring pulse 3–42 is applied to an integrator 3–40 to produce the wave 3–44 of graph F. Since the duration-measuring pulses 3–42 from the comparator 3–26 will always have the same amplitude, the slope of the integrator output will always be the same. The output rise, however, in each case will be proportional to the duration of the comparator output duration-measuring pulse 3–42, it being recalled that the pulse 3–42 is the fractional height duration of the original particle pulse 3–30. Thus, the integrator 3–40 has converted the duration-measuring pulse 3–42 into an electrical quantity which comprises the pulse 3–44 having a value, that is an amplitude in this case, that is proportional to the time duration of the duration-measuring pulse 3–42. This output pulse 3–44 has a ramp and pedestal or plateau profile, but it need not have the flat top, so long as its amplitude is proportional to the duration of the pulse 3–42. The output pulse 3–44 from the integrator 3–40 occurs at the line 3–46 and through this line is applied to the two threshold circuits 3–48 and 3–50. The purpose of these threshold circuits is to enable the circuit to choose from the desirable and undesirable pulses.

It is desired to pass the pulses which have the shortest durations, since these are the ones which are due to particles that follow axial or near axial paths in moving through the aperture. Also, it may be desirable to prevent the passage of pulses whose speed is inordinately fast, as for example, fast noise pulses. These latter could be caused by many outside sources such as faulty electrical connections external of the apparatus, ground currents due to high current switching in other parts of the apparatus, etc. Accordingly, the two threshold circuits enable the establishment of a "window" within which the integrated pulse must fall in order to result in an output from the circuit 3–10.

The upper level of the "window" is established by means of the reference voltage source 3–51 and the resistor 3–53 which is adjusted to provide the level 3–52 (graph F) at the input 3–54 of the comparator 3–56. The lower level of the "window" is established by means of the reference voltage source 3–51 and the resistor 3–58 which is adjusted to provide the level 3–60 (graph F) at the input 3–62 of the comparator 3–64. The comparators 3–56 and 3–64 will have outputs only when the inputs of the line 3–46 exceed their respective input levels 3–52 and 3–60. Examining graph F, it will be seen that as the pulse 3–44 rises, the slope crosses the level 3–60 at the time $t_4$ so that there is an output at the line 3–66 of a duration which will shortly be described. This pulse terminates at the time $t_6$ and is the square wave 3–68 of graph K. As for the comparator 3–56, since the pulse 3–44 never exceeds the level 3–52, there will be no output at the line 3–70.

When the delayed pulse 3–32 subsides below its half amplitude as set by the plateau of the pulse 3–28, the trailing edge of the comparator output pulse 3–42 is detected in the trailing edge detector 3–72 to provide a spike 3–74 (graph E) at the input 3–76 of the one-shot multivibrator or "strobing" one shot 3–78. It will be seen that the strobing one shot 3–78 is triggered at the time $t_5$ and produces a "strobing" pulse 3–80 (graph G) of a predetermined time duration. This duration is chosen to ensure that the following circuits have sufficient time to measure the final output pulse, and this may be from 1 to several microseconds. The time chosen in the illustration is $t_5$ to $t_6$ and hence the pulse 3–80 is a square wave of that duration, appearing at the line 3–82 and being applied simultaneously to the trailing edge detector 3–84, the veto AND gate 3–86, and the trailing edge detector 3–88.

The duration of the strobing pulse 3–80 controls the duration of the pulses 3–20, 3–28, and 3–44 through the trailing edge detector 3–88. The output of the latter at the line 3–90 is the differentiated spike 3–92 of graph H that triggers another reset one shot 3–94 to produce a reset pulse 3–96 (graph I) of any desired duration such as $t_6$ to $t_7$ that shorts the pulse stretcher 3–14 and the integrator 3–40 through the line 3–98 until their memory capacitors are completely discharged. This places the circuit in readiness for the next pulse.

Since the upper level 3–52 was not crossed by the pulse 3–44, there was no output from the comparator 3–56 on the line 3–70. There was also no pulse for the leading edge detector 3–100 to act upon and no set signal appearing at 3–102 to set the R.S. flip-flop 3–104. Likewise, there was no output on the line 3–106 to the veto input of the AND gate 3–86. There were outputs from the lower threshold circuit 3–50 on the line 3–66 and from the strobing one shot 3–78 on the line 3–82. Accordingly, the gate 3–86 produces an output at 3–110 which activates the precision electronic switch or analog gate 3–112. The output terminal 3–114 is now connected to the pulse stretcher 3–14 by way of the line 3–18 for the duration of the pulse on the path 3–110, which of course is the duration of the pulse 3–80 from the strobing one shot 3–78. The output at 3–114 then becomes the pulse 3–116 of graph N, having an amplitude X and a duration $t_5$ to $t_6$. All pulses which are passed by the circuit 3–10 have this same duration.

Consider now the particle Y which has traversed the aperture 22 far off center. This may produce a pulse such as that shown at 3–34 in graph A. The volume of the particle Y would most likely be proportional to the amplitude in the approximate center of the pulse since this is produced by the occurrence of the pulse in the center of the aperture along its length where the current density is probably most uniform. Instead of measuring this, however, it is desired to ignore this pulse and hence discard it so that it does not produce an output to be considered in the sizing study being made. If it is off the axis of the aperture, it is likely that its leading edge peak is an erroneous criterion of particle size (volume).

This particle produces the pulse 3–34 which again is applied to the terminal 3–12 and thence to the pulse stretcher 3–14 and the delay line 3–16. The circuitry performs the same operations which were described above in connection with the pulse 3–30 and hence the corresponding wave shapes are produced throughout the circuit albeit differing on account of the increased amplitude and duration of the pulse 3–34. The stretched pulse 3–120 has an amplitude Y and a duration which is approximately the same length as the pulse 3–20. The half height pulse 3–128 when compared with the delayed pulse 3–132 will now result in a duration-measuring pulse 3–142 which is much longer in time than the pulse 3–42. This pulse 3–142 appears at 3–38 and extends from the time $t_9$ to $t_{11}$ which is substantially greater than the time $t_3$ to $t_5$. When integrated, this pulse 3–142 produces a much larger pulse 3–144 whose leading edge has the same slope as the pulse 3–44. Because it lasts longer, the pulse 3–144 rises substantially higher than the pulse 3–44. When the lower threshold 3–60 is crossed there will be an output signal on the line 3–66 which, in this case, is the pulse 3–168. In this case, however, the upper threshold 3–52 is also crossed and this gives rise to conditions which differ from those obtaining in connection with the pulse 3–30.

Since the signal at 3–46 exceeds the upper threshold level, from the time $t_{10}$ that this occurs, there will be a signal output on the line 3–70 represented by the pulse 3–169 of graph J. The leading edge detector 3–100 produces a spike 3–171 (graph L) which appears at the line 3–102 and this sets the R.S. flip-flop 3–104 producing an output 3–173 on the line 3–106. Since this is a veto signal, it prevents the gate 3–86 from passing any signals, and as a result, even though the strobing one shot 3–78 operates, and there is a signal on 3–66, there will be no output at 3–110. In this manner the signal 3–34 is rejected and never appears at the terminal 3–114.

The pulses 3–174, 3–180, 3–192, and 3–196 are produced in the same manner as the pulses 3–74, 3–80, 3–92, and 3–96 respectively. In addition, the strobing one-shot pulse 3–180 has its trailing edge detected by the trailing edge detector 3–84 to produce a spike exactly like 3–192 which resets the R.S. flip-flop 3–104 to ready it for the next large pulse.

Where there is no concern over the presence of fast noise pulses, the lower threshold circuit 3–50 may be eliminated. Likewise, the R.S. flip-flop 3–104 and its associated leading edge and trailing edge detectors 3–100 and 3–84 may be eliminated and the veto input of the veto AND gate 3–86 driven directly from the output of the comparator 3–56. The presence of the R.S. flip-flop 3–104 ensures that the strobing pulse 3–108 is completed before the veto pulse is removed.

From the above, it will be seen that the important one of the threshold circuits 3–48 and 3–50 is the upper threshold circuit 3–48. This establishes the electrical effect of a standard equivalent to the maximum desired duration in order to distinguish between the pulses 3–44 and 3–144. In other words, the standard against which the integrated pulses are compared is the level 3–52 established by the upper threshold circuit. Noise and the like causing extremely fast pulses may be eliminated by other means besides a low threshold circuit at the point shown.

It will be appreciated also that the upper and lower thresholds are established by manual means in the sensor 3–10. It is feasible to have automatic levels within the scope of the basic invention.

Another important consideration of the relatively simple circuit which is described herein is that it presumes there will be little or no interference from pulses following one another in rapid succession and being applied to the circuit before analysis of a prior pulse is completed. Highly diluted suspensions will decrease interference. For taking care of the adverse situation where a signal arrives too soon after a prior one, an analog gate would be useful inserted in series with the lead 3–12 which would disconnect the circuit during an analysis and not reconnect it until both the circuit is through with an analysis cycle and the signal voltage at 3–12 would fall below some predetermined minimum. This would also tend to exclude noise from triggering the circuit. This could be controlled by a logic circuit, the inputs of which are taken from the various one-shot multivibrators and also a low threshold which sensed when the signal at 3–12 subsided below the predetermined minimum mentioned above.

Other refinements will be apparent to those skilled in the art. For instance, it would be advantageous to have a clamp in the path 3–24 which, while having no apparent effect for large signal levels, prevent the signal from falling below some predetermined lower limit so that under stand-by conditions the voltage at 3–24 exceeds the noise level of 3–26. This prevents unnecessary chattering at the lead 3–38.

As will be obvious from the above discussion, the sensor 3–10 is of the analog type. The output of the comparator 3–26 is a duration-measuring pulse 3–42 which is applied to the integrator 3–40 that converts the same into an electrical time signal pulse which is in this case the flat-topped pulse 3–44. This is the pulse that is compared with the two voltage levels 3–52 and 3–60 to determine whether the analog gate 3–112 will operate to permit electrical signals to pass to the terminal 3–114. The strobing pulse 3–80 on the line 3–82 occurs in the body of the stretched pulse 3–20 and excises a portion of that pulse as the output of the sensor. Thus, it is a newly constituted derived pulse 3–116 of some predetermined duration depending on the characteristics of the one-shot 3–78 and of an amplitude which is equal to the amplitude X. This is also the amplitude of the pulse 3–30.

Instead of integrating the duration-measuring pulse 3–42, it could be used to gate the passage of pulses from a continuous running clock oscillator so that its occurrence will permit a number of clock pulses to pass which is proportional to the duration of the duration-measuring pulse 3–42. This number of pulses may then be counted and the count compared with a predetermined number chosen to be the upper limit of clock pulses which represents the maximum duration of particle pulse it is desired to pass. If the number of pulses passed by the measuring pulse is greater than the upper limit preset into the counter, then the operation of the analog gate will be inhibited, and the strobing pulse 3–80 will have no effect; but if it is less than the upper limit, then the strobing pulse will be permitted to operate the analog gate long enough to produce the output signal 3-116 derived from the stretched pulse 3-20 that in turn is derived from the particle pulse 3–30.

The counter may be run up to a preset number by the clock pulses or run down from a preset number to zero to achieve a signal output.

In FIG. 4 a digital sensor is illustrated, being designated generally by the reference character 4–10. Everything preceding the comparator 4–26 is the same as in the FIG. 3A. The integrator 3–40 is replaced by the digital counter 4–40. The blocks 4–72, 4–78, 4–88, and 4–94 have the same function as those similarly numbered with prefix "3" in FIG. 3A. Several blocks are added, namely the clock oscillator 4–120, the multiple input OR circuit 4–122, and preset switch means 4–124. As a pulse is applied to the input terminal 4–12, it is stretched by the pulse-stretcher 4–14, attenuated by the attenuator 4–22, and delayed by the analog signal delay means 4–16. The duration of the pulse at 4–38 is a measure as before of the fractional height pulse width. Clock pulses are applied to AND element 4–132 continuously on line 4–121. The application of a pulse or a logical 1 on path 4–38 allows clock pulses from 4–120 to appear on the path 4–126 since, as will be described, the pre-set down counter 4–40 will have logical 1 applied to one or more of the inputs to the multiple OR gate 4–122. This being the case, the path 4–128 will also be carrying a logical 1. Under these conditions, clock pulses will cause the pre-set down counter to count down toward zero. However, for good pulses which it is desired to accept, the counter will have been pre-set to a higher number of clock pulses than will arrive during an output pulse from the comparator 4–26. Therefore, a logical 1 will remain on the path 4–128 if zero is never reached and when the strobing one-shot 4–78 is triggered by the trailing edge of the pulse from 4–26, the strobing one-shot output pulse at path 4–82 will pass through the AND gate 4–130 applying via path 4–110 a control pulse which turns the analog gate 4–112 on and strobes the pulse stretcher 4–14 as before, reconstructing at the output terminal 4–114 a pulse having the amplitude of the original particle pulse and the duration of the strobing one shot 4–78. At the trailing edge of the strobing impulse, the reset one shot 4–94 emits a pulse on the path 4–98 which resets the pulse stretcher 4–14 and causes the preset switch means 4–124 to preset the down-counter 4–40 to the desired predetermined maximum count.

When the preset down counter is so preset, a logic 1 will appear at 4–128 in preparation for the next pulse from comparator 4–26.

Now consider what happens when a particle pulse is applied to the terminal 4–12 which is longer measured at the desired fractional level than desired. The comparator 4–26 puts an output at 4–38 as before, hence permitting clock pulses from 4–120 to be applied on line 4–121 through the AND 132 on the path 4–126. Clock pulses cause the preset down counter to run down towards zero. When it reaches zero, all of the inputs at the multiple input OR 4–122 are removed and the output at 4–128 changes to a logical 0. This blocks any further clock pulses from coming through the AND 4–132 and simultaneously puts a logic 0 at the upper input 4–128 of the AND 4–130. The logic 0 at the upper input blocks the strobing pulse from being applied via the paths 4–82 and 4–110 to the analog gate 4–112. Hence, no output appears at the terminal 4–114. At the trailing edge of the strobing pulse the one shot 4–94 resets the pulse stretcher 4–14 and the preset down counter 4–40 as described above.

It is pointed out that the sensor 4–10 is simpler than the sensor 3–10 in several respects, especially in that there is no lower limit for the measurement of the duration measuring pulse. Other means to prevent low level noise from triggering the apparatus can be used.

Variations, modifications and refinements in the basic circuits which have been described above can be made. The practical apparatus will take into account effects which vary from ideal. For example, it has been assumed that the delay means 3–16 and 4–16 contribute no loss in amplitude of the signal which is produced thereby. This implies that there is an amplifier included in the block to compensate for any actual losses, or that the attenuator 3–22 or 4–22 is adjusted in each case to compensate for losses. Such losses would be expected in the event that the delay means is an L–C delay line since it is necessary to terminate the line with its characteristic impedance, which termination must also be assumed to be included in the blocks 3–16 and 4–16. It is, of course, feasible to use an active element delay device other than a line in which case these considerations may not be necessary.

What is desired to secure by Letters Patent of the United States is:

1. An axial trajectory sensor for use with a Coulter type particle analyzing apparatus in which particles passing through an aperture produce desirable particle pulses whose amplitudes are most nearly proportional to their respective sizes when passing closes to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration; said sensor acting to respond to said desirable particle pulses and not to respond to said other pulses and comprising:

A. input terminal means and output terminal means having a channel for passage of electrical signals between the terminals with switch means in said channel to control the signals which appear at the output terminal means, the input terminal means adapted to have said desirable and other particle pulses applied thereto, B. means for measuring the duration of at least a predetermined portion of a particle pulse applied to said input terminal means at some predetermined fraction of the amplitude thereof and deriving a duration-measuring pulse of constant amplitude and having the measured duration, C. means for converting said duration-measuring pulse into an electrical quantity whose value is proportional to the time duration of said duration measuring pulse, D. means establishing an electrical effect of a standard equivalent to a maximum desired duration distinguishing between quantities produced by desireable and other pulses, E. means comparing said quantity with said standard and providing one type of energizing signal if the quantity exceeds the standard and a second type of energizing signal if the said quantity does not exceed the standard, and F. means for applying one of said energizing signals to the switch means in said channel to permit passage to said output terminal means of only electrical signals derived from desirable particle pulses.

2. The sensor as claimed in claim 1 in which said last-mentioned derived electrical signals comprise output pulses of predetermined duration but having the respective amplitudes of desirable particle pulses.

3. The sensor as claimed in claim 1 in which the means for measuring duration is operative to measure the duration of the entire particle pulse at said predetermined fraction.

4. The sensor as claimed in claim 1 in which said applying means include gating means provided between said comparing means and said switch means, means connected with said gating means are provided to produce a strobing pulse from said duration-measuring pulse to energize said gating means and operate said switch means to pass any signal or part thereof which exists in said channel for the duration only of said strobing pulse, in which said first type of energizing signal inhibits operation of said gating means to prevent action of said strobing pulse on said switch means, and said second type of energizing signal enables said gating means.

5. The sensor as claimed in claim 1 in which said measuring means comprise circuitry to produce an electrical wave of a duration substantially longer than the duration of the particle pulse from which the same is derived and having a constant amplitude over a substantial portion of its duration which amplitude is said predetermined fraction of the amplitude of the particle pulse from which the same is derived, and means for comparing said last-mentioned particle pulse with said electrical wave during a period of time when the amplitude of said wave is constant.

6. The sensor of claim 5 in which said comparing means provides an output only while said last-mentioned particle pulse exceeds said amplitude of said electrical wave and said output being said duration-measuring pulse.

7. The sensor of claim 5 in which said circuitry includes a pulse stretcher and means for attenuating the output of the pulse stretcher.

8. The sensor of claim 7 in which said pulse stretcher is in the said channel, produces as its output pulse a stretched wave having the amplitude of the particle pulse from which the same is derived, and passes said stretched wave to said output terminal means only to the extent permitted by said switch means and without the intervention of said attenuating means.

9. The axial trajectory sensor of claim 1 in which the electrical quantity into which said duration-measuring pulse is converted comprises an electrical time signal pulse and the value thereof comprises the amplitude of said electrical time signal pulse, in which the electrical effect comprises a signal level and in which the comparing means compares the time signal pulse against the signal level to obtain said first and second types of energizing signals.

10. The sensor of claim 9 in which means are provided for establishing a second signal level equivalent to a minimum desired duration for said time signal pulse, and means for rendering the switch means inoperative in the event that any time signal pulse does not exceed said second signal level so that no electrical signals will be derived from any particle pulses whose duration is insufficient to produce a time signal pulse which exceeds said minimum desired duration.

11. The sensor of claim 9 in which said converting means comprise an integrator responsive to the measuring pulse and the time signal pulse is a flat-topped pulse of the ramp-and-pedestal type.

12. The sensor as claimed in claim 9 in which said applying means include gating means provided between said comparing means and said switch means, means connected with said gating means are provided to produce a strobing pulse from said measuring pulse to energize said gating means and operate said switch means to pass any signal or part thereof which exits in said channel for the duration only of said strobing pulse, in which said first type of energizing signal inhibits operation of said gating means to prevent action of said strobing pulse on said switch means, and said second type of energizing signal enables said gating means.

13. The sensor as claimed in claim 9 in which said electrical signals derived from desirable particle pulses comprise output pulses of predetermined duration but having the respective amplitudes of desirable particle pulses.

14. The sensor as claimed in claim 9 in which said means for measuring duration is operative to measure the duration of the entire particle pulse at said predetermined fraction of the amplitude thereof.

15. The sensor as claimed in claim 9 in which said measuring means comprise circuitry to produce an electrical wave of a duration substantially longer than the duration of the particle pulse from which the same is derived and having a constant amplitude over a substantial portion of its duration which is said predetermined fraction of the amplitude thereof and means for comparing said last-mentioned particle pulse with said electrical wave during a period of time when the amplitude of the said electrical wave is constant.

16. The sensor of claim 15 in which said comparing means provides an output only while said last-mentioned particle pulse exceeds the amplitude of said electrical wave and said output being said duration-measuring pulse.

17. The sensor of claim 15 in which said circuitry includes a pulse stretcher and means for attenuating the output of said pulse stretcher.

18. The sensor of claim 17 in which said pulse stretcher is in the said channel and passes said electrical wave to said output terminal means only to the extent permitted by said switch means.

19. The sensor of claim 9 in which means are provided for establishing a second signal level equivalent to a minimum desired duration for said time signal pulse, said comparing means also compares said time signal pulse against said second signal level and provides a third type of energizing signal if the time signal pulse exceeds the second signal level and a fourth type of energizing signal if the time signal pulse does not exceed the second signal level, said applying means include gating means provided between said comparing means and said switch means, means connected with said gating means are provided to produce a strobing pulse from said measuring pulse to energize said gating means and operate said switch means to pass any signal or part thereof which exists in said channel for the duration only of said strobing pulse, in which said first type of energizing signal inhibits operation of said gating means to prevent action of said strobing pulse on said switch means, said second type of energizing signal enables said gating means, said third type of energizing signal enables said gating means and said fourth type of energizing signal inhibits said gating means, whereby said strobing pulse will operate said switch means when the time signal pulse does not exceed said first signal level and does exceed said second level.

20. The sensor of claim 19 in which said gating means comprise a veto AND gate having a veto input and two AND inputs, one AND input is connected to said strobing pulse producing means, one AND input is connected to said comparing means to receive either of said third and fourth types of energizing signals, the third type being a logic 1 signal and the fourth type being a logic 0 signal, and the veto input is connected to said comparing means to receive either of said first and second types of energizing signals, the first type being a logic 1 signal and the second type being a logic 0 signal.

21. The sensor as claimed in claim 20 in which said comparing means comprise two comparators, one of which compares said time signal pulse with said first signal level and has an output comprising either said first or second type of energizing signal, and the second of which compares said time signal pulse with said second signal level and has an output comprising either said third or fourth type of energizing signal.

22. The sensor as claimed in claim 1 in which the electrical quantity into which said duration-measuring pulse is converted comprises a plurality of clock pulses and the value thereof comprises the number of pulses which can be passed for the duration of the duration-measuring pulse, in which the electrical effect comprises a preset number of pulses, and in which the comparing means compares the preset number of pulses with the number of pulses passed for the duration of the duration-measuring pulse to obtain said first and second types of energizing signals.

23. The sensor as claimed in claim 22 in which said applying means include gating means provided between said comparing means and said switch means, means connected with said gating means are provided to produce a strobing pulse from said duration-measuring pulse to energize said gating means and operate said switch means to pass any signal or part thereof which exists in said channel for the duration only of said strobing pulse, in which said first type of energizing signal inhibits operation of said gating means to prevent action of said strobing pulse on said switch means, and said second type of energizing signal enables said gating means.

24. The sensor as claimed in claim 22 in which said electrical signals derived from desirable particle pulses comprise output pulses of predetermined duration but having the respective amplitudes of desirable particle pulses.

25. The sensor as claimed in claim 22 in which said means for measuring duration is operative to measure the duration of the entire particle pulse at said predetermined fraction of the amplitude thereof.

26. The sensor as claimed in claim 22 in which said measuring means comprise circuitry to produce an electrical wave of duration substantially longer than the duration of the particle pulse from which the same is derived and having a constant amplitude over a substantial portion of its duration which is said predetermined fraction of the amplitude thereof and means for comparing said last-mentioned particle pulse with the said electrical wave during a period of time when the amplitude of the said electrical wave is constant.

27. The sensor of claim 26 in which said comparing means provides an output only while said last-mentioned particle pulse exceeds the amplitude of said electrical wave and said output being said duration-measuring pulse.

28. The sensor of claim 26 in which said circuitry includes a pulse stretcher and means for attenuating the output of said pulse stretcher.

29. The sensor of claim 28 in which said pulse stretcher is in said channel and passes said electrical wave to said output terminal means only to the extent permitted by said switch means.

30. The sensor of claim 22 in which said comparing means comprise a counter and means for presetting said counter to respond to said preset number of pulses by producing said energizing signal of said one type if the number of pulses passed by said duration-measuring pulse exceeds said preset number and producing said second type of energizing signal if the number of pulses passed by said duration-measuring pulse does not exceed said preset number.

31. The sensor of claim 30 in which said counter is a down counter, and each clock pulse passed by said durationmeasuring pulse decreases the count of said counter, and in which the first type of energizing signal is produced if the counter counts down to zero, and the second type of energizing signal is produced if the counter does not count down to zero.

32. The method of sensing between the particle pulses caused by particles passing through a Coulter particle apparatus aperture on axis of the aperture and off the axis of the aperture, which comprises:

A. measuring the duration of at least a predetermined portion of each particle pulse at a predetermined fraction of the amplitude thereof and deriving therefrom a duration-measuring pulse of constant amplitude and having a predetermined duration, B. converting the duration-measuring pulse into an electrical quantity whose value is proportional to the time duration of said duration-measuring pulse, C. establishing an electrical effect of a standard equivalent to a maximum desired duration distinguishing between quantities produced by particle pulses which pass through the aperture off the axis of the aperture and other particle pulses of shorter duration, D. comparing the said quantity with the standard to obtain an energizing signal of one type if the quantity exceeds the standard and a second type of energizing signal if the quantity does not exceed the standard, E. deriving an electrical signal from each said particle pulse, and F. blocking or passing said derived signal on the basis of whether it has produced an energizing signal of the first type or the second type, respectively.

33. The method as claimed in claim 32 in which the electrical quantity into which said duration-measuring pulse is converted comprises an electrical time signal pulse and the value thereof comprises the amplitude of said electrical time signal pulse, in which the electrical effect comprises a signal level and in which said comparing step compares the time signal pulse against the signal level to obtain the said first and second types of energizing signals.

* * * * *